Patented Apr. 20, 1954

2,676,181

UNITED STATES PATENT OFFICE 2,676,181

OXIDATION OF STEROIDS

Arthur R. Hanze, Kalamazoo, Mich., assignor to The Upjohn Company, Kalamazoo, Mich., a corporation of Michigan No Drawing. Application November 13, 1951, Serial No. 256,159

4 Claims. (Cl. 260—397.3)

The present invention relates to the oxidation of certain steroid compounds and is more particularly concerned with a novel process for the conversion of an 11-hydroxy group in a steroid nucleus to a keto group.

The starting compounds utilized in the process of the present invention are compounds having an 11-hydroxy group in the steroid nucleus. These compounds may, in addition, have substituents attached to the other carbon atoms of the steroid molecule, such as, for example, in the 3, 4, 7, 9, 10, 12, 13, 17, 20, 21 and other positions, and may have a double bond in one or more of these various positions.

According to the method of the present invention, a steroid containing an 11-hydroxy group is reacted in the heterogeneous mixture of an organic solvent, which is essentially water-insoluble, and an aqueous solution of chromic acid, at a temperature below about thirty degrees centigrade to cause oxidation of the 11-hydroxy group to an 11-keto group.

It is an object of the present invention to provide a novel process which is useful in the preparation of physiologically-active steroids, particularly those containing a keto group at carbon atom 11. Another object of the present invention is the provision of a process for the oxidation of the 11-hydroxy group in a steroid nucleus to a keto group in high yield and without formation of appreciable quantities of undesirable oxidation products. Still another object of the present invention is to provide a novel process for the oxidation of the 11-hydroxy group of a steroid molecule to a keto group which utilizes a two-phase, organic-aqueous reaction medium. Other objects of the present invention will be apparent to those skilled in the art to which this invention pertains.

The novel process of the present invention has utility in the preparation of certain steroid intermediates having an oxygen atom in the 11-position in ring C of the steroid nucleus. The novel process is of especial interest in the field of steroid research since the 11-oxygenated cortical hormones are known to possess biological activity which is markedly different in effect than that of steroids not oxygenated at carbon atom 11.

The starting compounds for the method of the present invention are characterized by the presence of the 11-hydroxy group and may, in addition, have one or more keto, hydroxy, halogen or other common steroid substituents attached to carbon atoms 3, 7, 9, 17, 20, 21 or other carbon atoms, and may have unsaturation in various positions in the steroid nucleus, usually in the 4, 5, 7, 17, 20 or other positions. Frequently, the starting materials have a cholane, norcholane, pregnane, etiocholane, endrostane, or other typical steroid nucleus, in which the length of the carbon side-chain attached to the 17-position has from zero to nine or more carbon atoms. Such compounds as 11-hydroxypregnane-3,20-dione, 11-hydroxyallopregnane-3,20-dione, 11-hydroxyprogesterone and 3,11-dihydroxypregnane-20-one are very satisfactory starting materials. Many other steroids having an 11-hydroxy group in the nucleus, such as corticosterone acetate, 17-hydroxycorticosterone acetate, 11,17-dihydroxyprogesterone, 3 - keto - 11,17,20,21-tetrahydroxy - 4 - pregnane - 20,21 - diacetate, 3,11,21 - trihydroxy - 20 - keto - allopregnane-21 - acetate, 3,11,17,21 - tetrahydroxy - 20 - keto-allopregnane - 21 - acetate, 3 - acetoxy - 11-hydroxypregnane-20-one, 3,11-dihydroxycholanic acid, 11-hydroxycholanic acid, 3,11-dihydroxy-12 - keto cholanic acid, 3,11 - dihydroxy - etiocholanic acid and 3,11-dihydroxyandrostane-17-one, are also suitable starting steriod compounds. These compounds, as well as numerous others having the requisite 11-hydroxy group in ring C of the steroid nucleus, are available through methods known to the prior art.

In practicing the method of the present invention, the steroid compound to be oxidized is dissolved in an organic solvent which is substantially water-immiscible. Solvents such as benzene, toluene, chloroform, ethyl acetate, normal hexane, orthochlorotoluene, carbon tetrachloride, and chlorobenzene may be advantageously employed, the latter solvent being preferred. The proper solvent is one which readily dissolves the steroid, is substantially non-reactive with the reactants and reaction products, and is substantially immiscible with water. The oxidizing media is prepared by dissolving an alkali metal dichromate salt in water, the hydrated sodium dichromate ($Na_2Cr_2O_7.2H_2O$) being the preferred dichromate salt, although other dichromate or even chromate salts can be used. To the resulting aqueous alkali metal dichromate solution is added an acid, for example, a mineral acid such as sulfuric acid, or a sulfonic acid, such as para-toluenesulfonic acid. The function of the acid is merely to furnish hydrogen ions in the oxidizing media and, therefore, acids such as sulfuric, phosphoric, and the like, may be employed. The solution of the starting steroid in the organic solvent is then admixed with the aqueous oxidizing media, formed by reaction of the alkali metal dichromate solution with the acid, at a temperature below about thirty degrees centigrade, the temperature range of from about minus thirty degrees centigrade to about thirty degrees centigrade being entirely satisfactory with about minus ten to plus ten degrees centigrade being the preferred temperature range. The order of mixing the reactants is not critical and admixing of the solutions is generally conducted by adding small portions of one solution to the other at the indicated temperatures, accompanied by continual stirring or other agitation. The entire mixture is usually stirred for an additional period of from about one-half to about five hours, during which time the oxidation of the steroid 11-hydroxy group to the keto group is effected. Oxidation of the steroid 11-hydroxy group apparently occurs at the liquid interface of the two-phase system in which the organic phase contains the steroid being oxidized and the aqueous phase contains the chromic acid and other water-soluble constituents. The oxidized steroid has a greater tendency to remain in the organic phase than the unoxidized starting material since the polar 11-hydroxy group has been oxidized to the less polar keto group. Thus, the oxidized steroid does not appreciably enter into or become dissolved in the aqueous phase containing the oxidizing medium and so is not subject to repeated contact with the oxidizing agent. Upon completion of the oxidation, usually in from about one-half to eight hours, with about two hours being preferred, the organic layer is separated from the aqueous layer by conventional separation procedures. The aqueous layer may then be extracted with successive portions of benzene or other organic solvent which is substantially water-immiscible and in which the product is soluble. The organic extractions are separated and combined with the first organic layer and the combined organic solutions are then washed with successive portions of water and sodium bicarbonate or other weakly basic solution to remove any acidic material. The oxidized product may then be recovered from the organic layer by conventional procedure, such as drying over anhydrous sodium sulfate, filtering and concentrating to give the desired steriod having the keto group in the 11-position. Other conventional procedures for the separation of the 11-keto product are satisfactory and may be employed if desired.

When the starting 11-hydroxy steroid also contains other oxidizable groups, these latter groups may also be oxidized, so that the extent of oxidation is best controlled by regulating the number of molar equivalents of the alkali metal dichromate and acid which are used to form the aqueous phase of the novel two-phase oxidation system.

Since the oxidation appears to take place at the interface between the organic phase containing the steroid and the aqueous phase containing the chromic acid and since the oxidation products are less water-soluble than the starting materials and are consequently retained in the organic phase, the oxidation is achieved without the formation of tarry or other undesirable highly-oxidized products and, consequently, unusually high yields of desired 11-keto steroid are achieved. Yields above eighty percent of the theoretical are consistently obtained whereas, in prior art single-phase chromic acid oxidations, the yields have been relatively small due to formation of tarry oxidation and partial-oxidation products. These high yields of 11-keto steroids are unusual because of the stereochemistry associated with the 11-position in ring C of the steroid nucleus, especially since it is known that substituents in the 11-position, especially those having the 11-beta stereochemical configuration, are influenced by very marked stearic hindrance. Oxidations of 11-hydroxy groups have therefore been considered very difficult as compared with the oxidation of groups in other positions of the steroid nucleus, as for example in the 3-position of ring A, where the effect of stearic hindrance is only minimal.

The following examples are given to illustrate the process of the present invention, but are not to be construed as limiting.

PREPARATION 1.—11α-HYDROXYPROGESTERONE

To four liters of a 32–48 hour growth of culture RH 176 (*Rhizopus arrhizus* strain) was added one gram of progesterone in fifty milliliters of acetone, providing a suspension of the steroid in the water of the culture. The culture was then incubated at room temperature for 48 hours. At the end of this time the pH of the medium was 3.5 and the fermentation liquor and mycelia was extracted successively with three one-liter portions, one two-liter portion, and one one-liter portion of methylene chloride. The methylene chloride extracts were combined and washed with two 400-milliliter portions of two percent aqueous sodium bicarbonate solution and three 500-milliliter portions of water. The methylene chloride extract was evaporated to dryness in vacuo and the solids taken up in fifty milliliters of methylene chloride. The solution was transferred to a 100-milliliter beaker and evaporated by a stream of air. The solids, weighing 1.585 grams, were dissolved in five milliliters of hot methanol and allowed to cool slowly at room temperature whereupon 75 milligrams of crystals separated out. The mother liquor was freed of solvent by aeration, dissolved in fifty milliliters of benzene, and chromatographed over alumina ($Al_2O_3$). Fifty grams of acid-washed alumina, dried at 45 degrees centigrade, was used as adsorbent and 100-milliliter portions of solvents were used to develop the column. The solvents and the order used were as follows: Benzene, benzene, benzene plus 5% ether, benzene plus 5% ether, benzene plus 10% ether, benzene plus 10% ether, benzene plus 10% ether, benzene plus 50% ether, benzene plus 50% ether, benzene plus 50% ether, ether, ether, ether, ether plus 5% chloroform, ether plus 5% chloroform, ether plus 10% chloroform, ether plus 10% chloroform, ether plus 50% chloroform, ether plus 50% chloroform, chloroform, chloroform, chloroform plus 5% acetone, chloroform plus 5% acetone, chloroform plus 10% acetone, chloroform plus 10% acetone, chloroform plus 50% acetone, chloroform plus 50% acetone, acetone, acetone, acetone plus 5% methanol, acetone plus 5% methanol, acetone plus 10% methanol, acetone plus 10% methanol, acetone plus 50% methanol, acetone plus 50% methanol. The chloroform and chloroform plus 5% acetone eluates were combined, evaporated to dryness, the residue dissolved in two milliliters of hot methanol and filtered. After overnight refrigeration, 171 milligrams of crystalline 11α-hydroxyprogesterone, melting at 166 to 167 degrees centigrade was obtained. A recrystallized sample gave the following constants: Melting point, 166–167 degrees centigrade; $[\alpha]_D^{20}$ plus 175.9 degrees (chloroform).

Analysis: Calculated for $C_{21}H_{30}O_3$: C, 76.4; H, 9.10. Found: C, 76.60; H, 8.92.

The structure of this product was further established by its conversion, with chromic acid in acetic acid, to the known 11-ketoprogesterone [Reichstein, Helv. Chim. Acta. 23, 684 (1940); ibid. 26, 721 (1943)].

PREPARATION 2.—11α-HYDROXYALLOPREGNANE-3,20-DIONE

Five hundred milligrams of 11α-hydroxyprogesterone, obtained according to the method of Preparation 1, and 250 milligrams of a palladium supported on charcoal catalyst in 150 milliliters of methanol were hydrogenated until about one molar equivalent of hydrogen had been absorbed. The mixture was filtered and the filter cake, containing primarily the precipitated catalyst, was washed with one hundred milliliters of acetone in small portions. The acetone washings were combined with the methanolic filtrate and the resulting organic solutions chromatographed on a column containing 25 grams of a mixture formed in the ratio of one part by weight of activated carbon (Darco G-60) to two parts by weight of diatomaceous earth (Celite 545). The column was developed with eight successive 200-milliliter portions of acetone which were discarded and then further developed with four successive 200-milliliter portions of methylene chloride. The methylene chloride eluates were then combined and evaporated to dryness, producing 158.7 milligrams of 11α-hydroxyallopregnane-3,20-dione, a yield of 31 percent of the theoretical.

PREPARATION 3.—11α-HYDROXYPREGNANE-3,20-DIONE

Thirteen and three-tenths grams of cadmium chloride hydrate was dissolved in 100 milliliters of water at seventy degrees centigrade and a twenty percent aqueous solution of sodium carbonate then added in small portions, with constant stirring, until a precipitate of cadmium carbonate was formed. The precipitate was filtered, washed free of residual alkali with warm water and re-suspended in 100 milliliters of water to form a slurry. To this slurry was added six milliliters of an aqueous solution of palladium chloride containing 0.6 gram of palladium, and then one milliliter of a 37 percent aqueous solution of formaldehyde. The mixture was warmed on a steam bath to 65 degrees centigrade and a thirty percent aqueous solution of sodium hydroxide added dropwise, with continual stirring, until palladium precipitated. The black-colored precipitate was washed by decantation with twelve successive fifty-milliliter portions of water and then filtered by suction. The precipitate on the funnel was washed eight times, dried by suction, and heated in an oven at 210 degrees centigrade for a period of thirteen hours. Seven and two-tenths grams of a palladium catalyst supported on cadmium carbonate was obtained.

Two hundred and fifty milligrams of the palladium on cadmium carbonate catalyst in 100 milliliters of methanol was hydrogenated to reduce the catalyst, 500 milligrams of 11α-hydroxyprogesterone obtained according to the method of Preparation 1 added, and hydrogenation continued until a total of one molar equivalent of hydrogen has been absorbed. The reaction mixture was filtered, the filter cake washed with 100 milliliters of acetone in small portions, and the washings combined with the methanolic filtrate. The resulting solution was chromatographed on a column containing 25 grams of a mixture formed in a ratio of one part by weight of activated carbon (Darco G-60) to two parts by weight of diatomaceous earth (Celite 545). The column was developed with eight successive 200-milliliter portions of acetone, the first five fractions of which were combined and evaporated to dryness, producing 356.1 milligrams of 11α-hydroxypregnane-3,20-dione, a yield of seventy percent of the theoretical.

*Example 1.—Oxidation of 11α-hydroxypregnane-3,20-dione and 11α-hydroxy-allopregnane-3,20-dione*

Nine hundred and fifty-five milligrams (2.87 millimoles) of a mixture containing 668.5 milligrams of 11α-hydroxypregnane-3,20-dione, prepared according to the procedure of Preparation 3, and 286.5 milligrams (thirty percent) of 11α-hydroxyallopregnane-3,20-dione, prepared according to the procedure of Preparation 2, were dissolved in 11.3 milliliters of chlorobenzene. The resulting chlorobenzene solution was added in small portions, with continual stirring, to a mixture formed by reacting 865 milligrams of hydrated sodium dichromate in 6.7 milliliters of water with 1.16 milliliters of concentrated sulfuric acid maintained in an ice bath, and the entire mixture was stirred for two hours in an ice bath. The chlorobenzene and aqueous layers were separated, and the aqueous layer extracted with two successive fifty-milliliter portions of benzene. The chlorobenzene layer and benzene fractions were combined and washed successively with two fifty-milliliter portions of water, fifty milliliters of saturated sodium bicarbonate solution, and then two additional fifty-milliliter portions of water. The organic layer was separated from the aqueous washings and dried over anhydrous sodium sulfate, filtered, and concentrated to give a crystalline residue of 839 milligrams, a total yield of 87.8 percent of the theoretical. The crystalline residue was extracted with a mixture of thirty percent acetone and seventy percent ether, and the extract concentrated to yield 771.9 milligrams (92 percent of the residue) of pregnane-3,11,20-trione, melting at 150-153 degrees centigrade. About 65 milligrams (eight percent of the residue) of substantially pure allopregnane-3,11,20-trione, melting at 205-210 degrees centigrade, was then isolated from the fraction of the residue which was insoluble in the acetone-ether mixture. The overall yield of pregnane-3,11,20-trione was 80.7 percent and the overall yield of allopregnane-3,11,20-trione was about 22.8 percent of that theoretically obtainable from the starting mixture of 11α-hydroxypregnane-3,20-dione and 11α-hydroxyallopregnane-3,20-dione. In addition to melting points, the above products were identified by infra red spectra. Ethylacetate has also been found to effect a good separation of allo and normal pregnane-3,11,20-triones.

*Example 2.—Oxidation of 11α-hydroxypregnane-3,20-dione*

Four hundred fifty milligrams of substantially pure 11α-hydroxypregnane-3,20-dione, obtained according to the procedure of Preparation 3, was mixed with 5.3 milliliters of chlorobenzene and the resulting chlorobenzene solution added, in small portions, with continual stirring, to a mixture obtained by dissolving 707 milligrams of hydrated sodium dichromate ($Na_2Cr_2O_7.2H_2O$) in 3.1 milliliters of water with 0.93 milliliter of concentrated sulfuric acid maintained in an ice-bath, and the resulting reaction mixture stirred for an additional two hours in an ice bath. The chlorobenzene and aqueous layers were separated, and the aqueous layer extracted with two successive portions of benzene. The combined chlorobenzene and benzene layers were separated from the aqueous layer and washed successively with two fifty-milliliter portions of water, one 100-milliliter portion of saturated sodium bicarbonate solution, and two fifty-milliliter portions of water.

The organic layer was separated from the aqueous washings, dried over anhydrous sodium sulfate, filtered, and concentrated to give a crystalline residue of 367.2 milligrams (81.6 percent) of pregnane-3,11,20-trione, melting at 150-153 degrees centigrade.

*Example 3.—Oxidation of 11α-hydroxyallopregnane-3,20-dione*

Following the same procedure as in Example 2, 300 milligrams of 11α-hydroxyallopregnane-3,20-dione in 3.5 milliliters of chlorobenzene was oxidized with 471 milligrams of hydrated sodium dichromate ($Na_2Cr_2O_7.2H_2O$) in 2.1 milliliters of water and 0.62 milliliter of concentrated sulfuric acid. Two hundred fifty five and nine-tenths milligrams, an 85.3 percent yield, of allopregnane-3,11,20-trione was obtained.

*Example 4.—Oxidation of 11α-hydroxyprogesterone*

Following the procedure of Example 2, 10.0 grams of 11α-hydroxyprogesterone in 122 milliliters of chlorobenzene was oxidized with a mixture formed from 5.97 grams of potassium dichromate ($K_2Cr_2O_7$), ninety milliliters of water and fifteen milliliters of concentrated sulfuric acid. A yield of 6.14 grams, a 61 percent yield, of 4-pregnene-3,11,20-trione, melting at 175-177 degrees centigrade with an $[\alpha]_D^{24}$ of plus 224 degrees (acetone), was obtained. A second crop of 2.31 grams was obtained from the mother liquors and had an $[\alpha]_D^{24}$ of plus 220 degrees (acetone).

*Example 5.—Oxidation of 3α,11α-dihydroxypregnane-20-one*

Following the procedure of Example 2, 340 milligrams of 3α,11α-dihydroxypregnane-20-one in 3.9 milliliters of normal hexane was oxidized with 646 milligrams of potassium dichromate ($K_2Cr_2O_7$) in 4.4 milliliters of water and 1.33 milliliters of concentrated sulfuric acid. Two hundred seventy-eight and eight-tenths milligrams, an 82 percent yield, of pregnane-3,11,20-trione was obtained.

*Example 6.—Oxidation of 11α-hydroxypregnane-3,20-dione*

In the same manner as given in Example 1, pregnane-3,11,20-trione is prepared from 11α-hydroxypregnane-3,20-dione using para-toluenesulfonic acid instead of sulfuric acid.

By following the procedure outlined in these examples, other steroid compounds having an 11α- or 11β-hydroxy stereochemical configuration are oxidized in high yields to the corresponding 11-keto compound. Thus, corticosterone acetate, 17-hydroxycorticosterone acetate, 11, 17 - dihydroxyprogesterone, 3 - keto - 11,17,20, 21-tetrahydroxy-4-pregnene 20,21-diacetate, 3,- 11,21 - trihydroxy - 20 - keto - allopregnane - 21 - acetate, 3,11,17,21 - tetrahydroxy - 20 - keto-allopregnane - 21 - acetate, 3 - acetoxy - 11 - hydroxypregnane - 20 - one and 3,11 - dihydroxypregnane - 20 - one can be oxidized to produce the corresponding 11 - keto derivative by employing the method of the examples. Still other starting materials, such as 3,11 - dihydroxycholanic acid, 11-hydroxycholanic acid, 3,11 - dihydroxy-12-keto cholanic acid, 3,11-dihydroxyetiocholanic acid, 3,11-dihydroxyandrostane-17-one, and the like, are likewise successfully oxidized to give high yields of desired steroid product containing a keto group in the 11-position of the steroid nucleus.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. The process for conversion of the 11-hydroxy group in 11α-hydroxypregnane-3,20-dione to a keto group which comprises: providing an aqueous solution of chromic acid by forming an aqueous solution of an alkali-metal dichromate and a mineral acid, providing a solution of 11α-hydroxypregnane-3,20-dione in a benzenoid organic solvent which is substantially water-immiscible, and mixing the two solutions at a temperature between about minus ten degrees and about plus thirty degrees centigrade to cause oxidation of the steroid 11-hydroxy group to a keto group and separating the pregnane-3,11,20-trione thus produced.

2. The process for conversion of the 11-hydroxy group in 11α-hydroxypregnane-3,20-dione to a keto group which comprises: providing an aqueous solution of chromic acid, providing a solution of 11α-hydroxypregnane-3,20-dione in an organic solvent which is substantially water-immiscible, and admixing the two solutions at a temperature below about thirty degrees centigrade to cause oxidation of the steroid 11α-hydroxy group to a keto group and separating the pregnane-3,11,20-trione thus produced.

3. The process for conversion of the 11-hydroxy group in 11α-hydroxypregnane-3,20-dione to a keto group which comprises: providing an aqueous solution of chromic acid by forming an aqueous solution of an alkali metal dichromate and an acid, providing a solution of 11α-hydroxypregnane-3,20-dione in an organic solvent which is substantially water-immiscible, and mixing together the two solutions at a temperature between about minus thirty and plus thirty degrees centigrade to cause oxidation of the steroid 11-hydroxy group to a keto group and separating the pregnane-3,11,20-trione thus produced.

4. The process for conversion of the 11-hydroxy group in 11α-hydroxypregnane-3,20-dione to a keto group which comprises: providing an aqueous solution of chromic acid by forming an aqueous solution of an alkali metal dichromate selected from the group consisting of sodium dichromate and potassium dichromate and concentrated sulfuric acid, providing a solution of 11α-hydroxypregnane-3,20-dione in chlorobenzene, and mixing the two solutions at a temperature between about minus ten degrees centigrade and about plus ten degrees centigrade to cause oxidation of the steroid 11-hydroxy group to a keto group and separating the pregnane-3,11,20-trione thus produced.

References Cited in the file of this patent

UNITED STATES PATENTS

| Number | Name | Date |
|---|---|---|
| 1,933,003 | Boedecker | Oct. 31, 1933 |

OTHER REFERENCES

Mason et al., Jour. Biol. Chem., 120, pp. 721 and 732 (1937).

Reichstein et al., Helv. Chem. Acta, vol. 24 Supplement, pp. 249E and 262E (1941).